United States Patent
Reisinger et al.

(10) Patent No.: US 7,080,866 B2
(45) Date of Patent: Jul. 25, 2006

(54) THROUGH-SEAT HOLDER FOR MOTOR VEHICLE

(75) Inventors: Alexander Reisinger, Langenfeld (DE); Jürgen Salewski, Düsseldorf (DE); Wolfgang Sitzler, Wuppertal (DE); Hartmut Bohlke, Wuppertal (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/062,106

(22) Filed: Feb. 17, 2005

(65) Prior Publication Data

US 2005/0184545 A1  Aug. 25, 2005

(30) Foreign Application Priority Data

Feb. 20, 2004  (DE) ...................... 10 2004 008 828

(51) Int. Cl.
*B60R 7/00*  (2006.01)

(52) U.S. Cl. .................................................. 296/24.4

(58) Field of Classification Search .............. 296/24.4, 296/24.43, 24.46, 37.1, 37.8, 37.15, 37.16; 297/188.04, 188.06, 188.07
See application file for complete search history.

(56) References Cited

U.S. PATENT DOCUMENTS

| | | | | |
|---|---|---|---|---|
| 4,637,648 A | * | 1/1987 | Okino et al. ................... | 296/63 |
| 4,880,264 A | * | 11/1989 | Yamazaki et al. ........... | 292/226 |
| 4,904,003 A | * | 2/1990 | Yamazaki et al. .......... | 292/126 |
| 5,039,155 A | * | 8/1991 | Suman et al. ............. | 296/65.03 |
| 5,599,054 A | * | 2/1997 | Butz et al. ................. | 296/37.8 |
| 5,603,550 A | * | 2/1997 | Holdampf et al. .......... | 297/238 |
| 5,632,520 A | * | 5/1997 | Butz ........................ | 296/24.43 |
| 5,816,640 A | * | 10/1998 | Nishimura ................. | 296/37.8 |
| 6,378,941 B1 | * | 4/2002 | Opfer et al. ................. | 297/257 |
| 6,398,284 B1 | * | 6/2002 | Butz et al. ................ | 296/37.15 |
| 6,508,508 B1 | * | 1/2003 | Bargiel ................... | 297/188.16 |
| 6,547,323 B1 | * | 4/2003 | Aitken et al. ............... | 297/113 |
| 6,814,398 B1 | * | 11/2004 | Hashimoto ............. | 296/190.11 |
| 6,905,167 B1 | * | 6/2005 | Jost ........................ | 297/188.04 |
| 2005/0116490 A1 | * | 6/2005 | Sitzler et al. ............ | 296/37.15 |
| 2005/0151398 A1 | * | 7/2005 | Sitzler et al. ............... | 296/218 |

FOREIGN PATENT DOCUMENTS

| | | | | |
|---|---|---|---|---|
| DE | 36 25 666 | | 2/1988 | |
| DE | 37 38 931 | | 6/1989 | |
| DE | 29711197 | * | 8/1998 | |
| DE | 29803305 | * | 8/1998 | |
| EP | 893306 | * | 1/1999 | |
| JP | 361193949 | * | 8/1986 | .............. 296/37.16 |

* cited by examiner

*Primary Examiner*—H Gutman
(74) *Attorney, Agent, or Firm*—Andrew Wilford

(57) ABSTRACT

A through-seat holder for a motor vehicle has a vehicle frame having generally parallel longitudinal members and transverse side members interconnecting ends of the longitudinal members and defining therewith a throughgoing opening. The longitudinal members are spaced apart by a predetermined transverse distance and form a pair of parallel outwardly facing guide faces flanking the opening and spaced apart by a predetermined transverse dimension greater than the transverse distance. A device frame fittable in the opening of the vehicle frame has generally parallel longitudinal members and transverse side members interconnecting ends of the respective longitudinal members. One of the device-frame transverse members is formed with a rim having a transverse width equal substantially to the dimension so that the rim cannot pass through the opening when extending transversely. The rim forms a pair of transversely spaced contact points engageable with the faces and defining a transversely extending pivot axis.

19 Claims, 5 Drawing Sheets

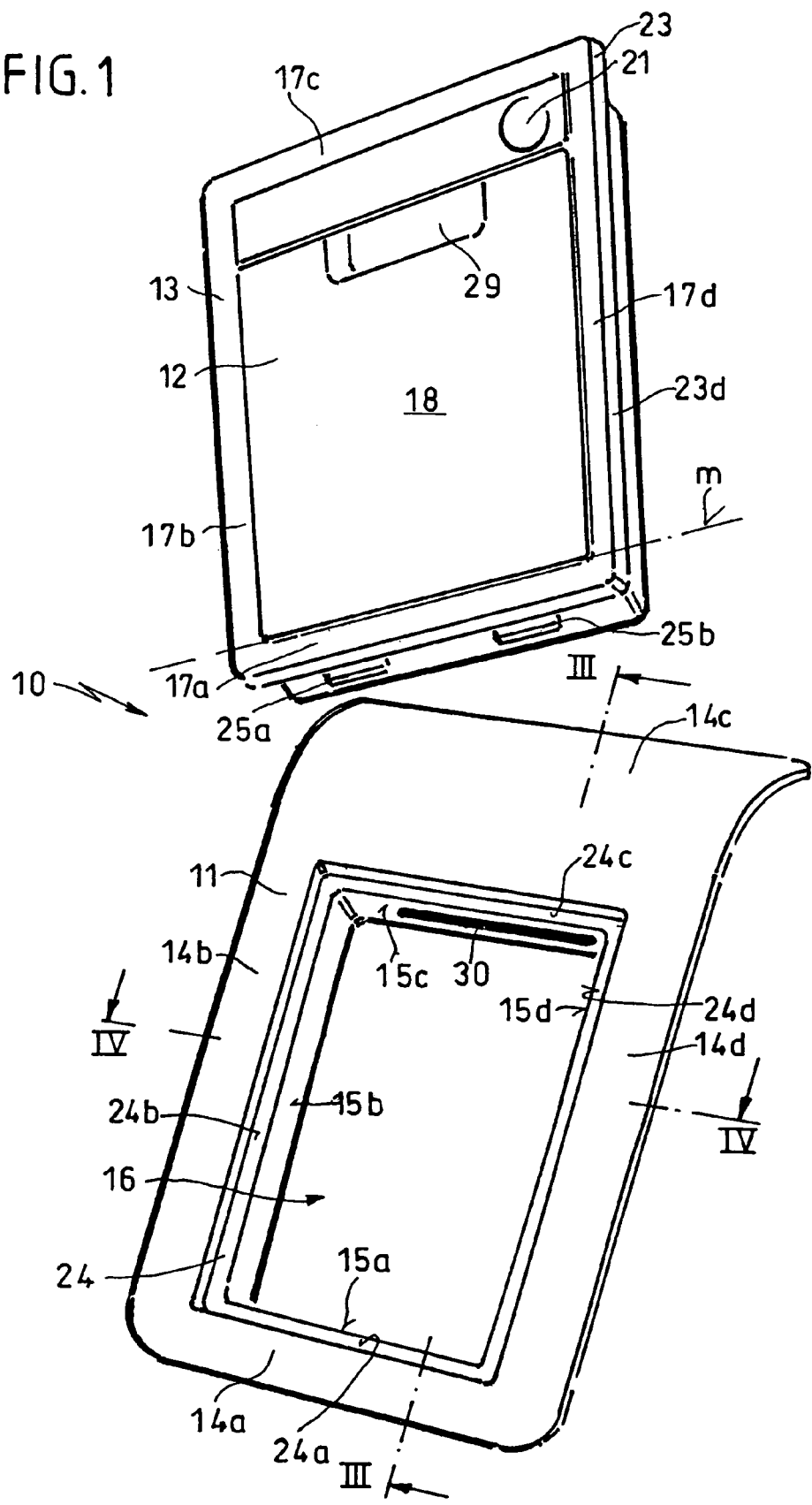

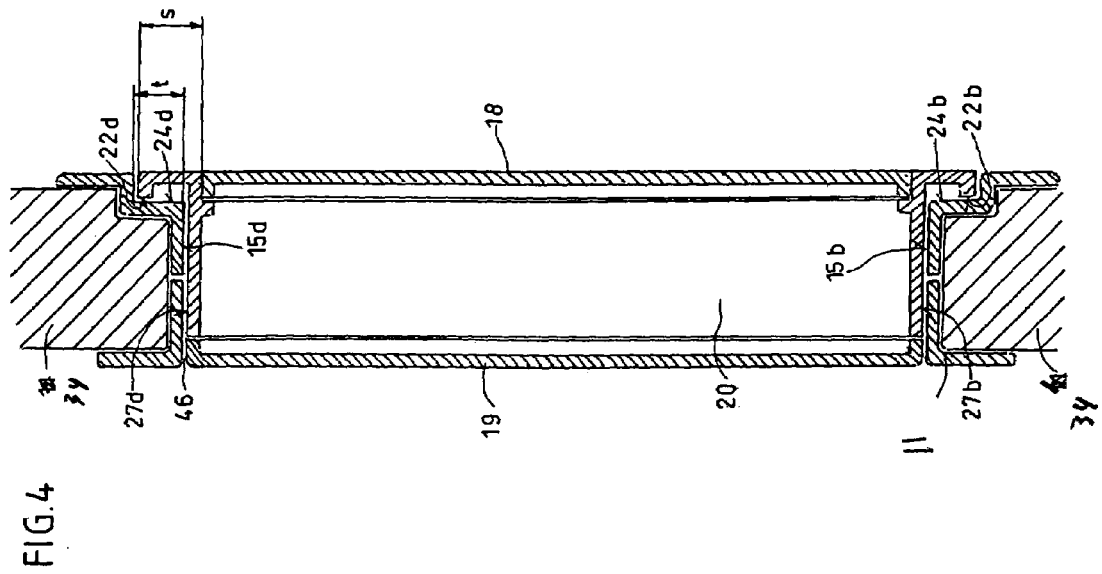
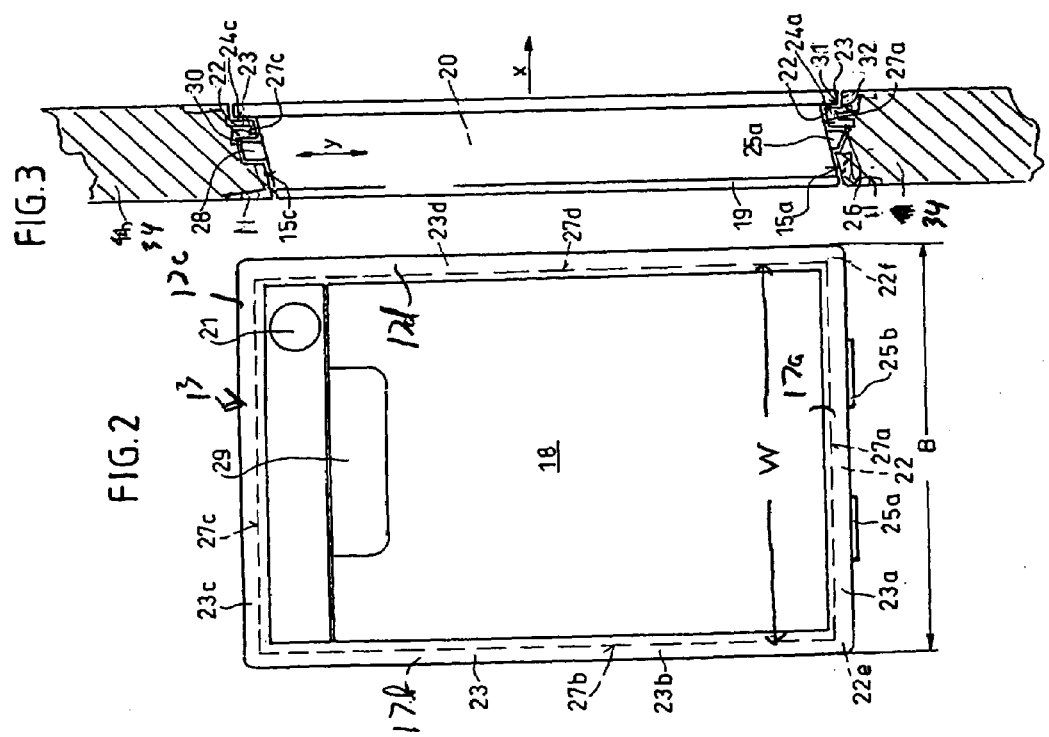

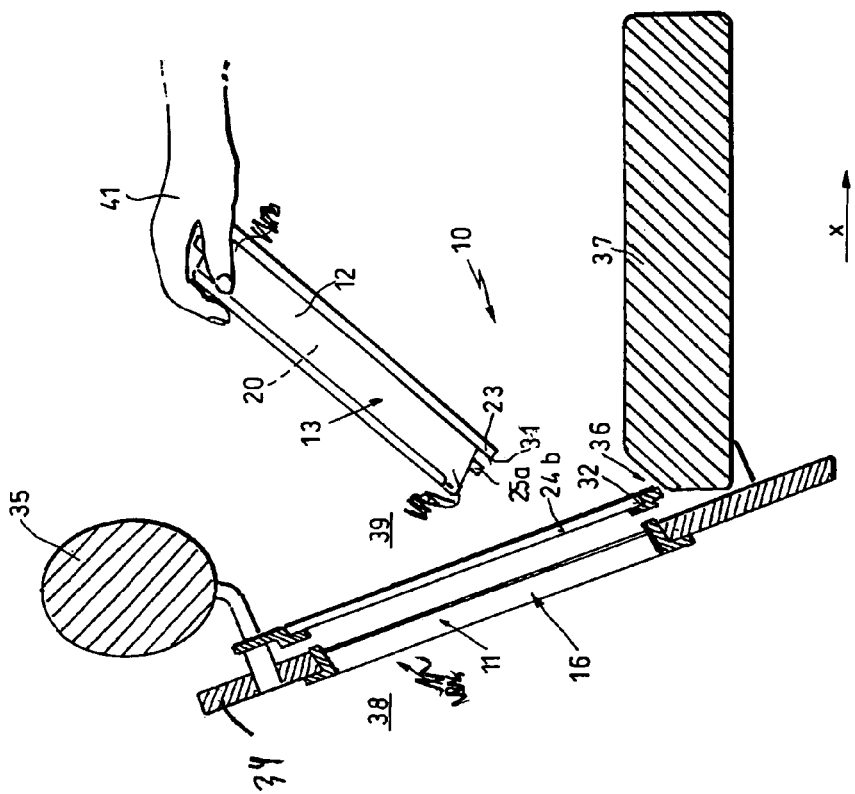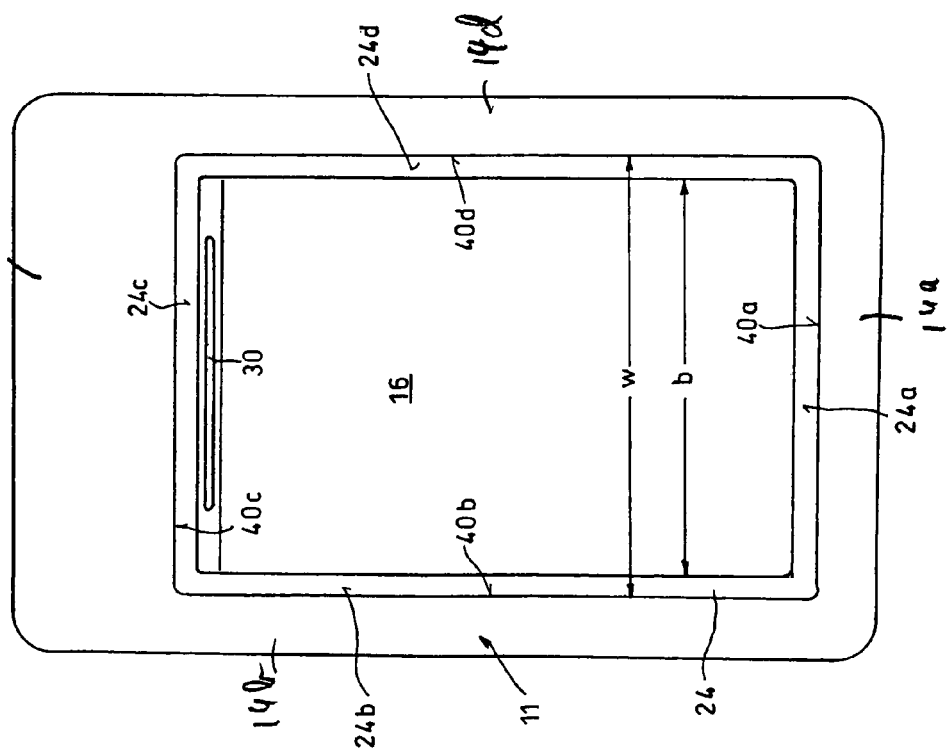

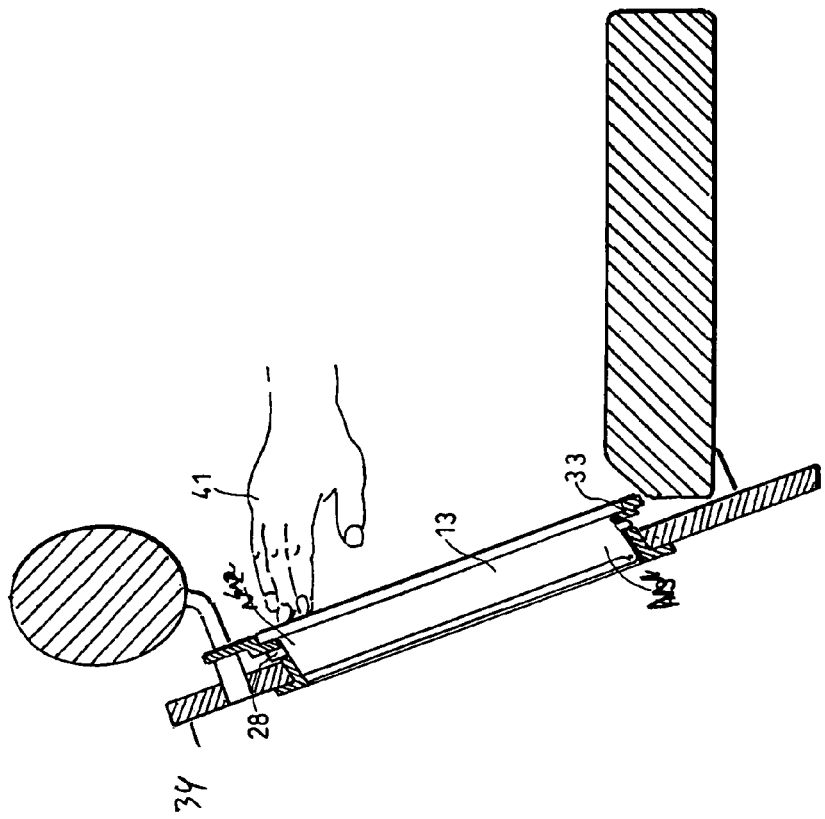
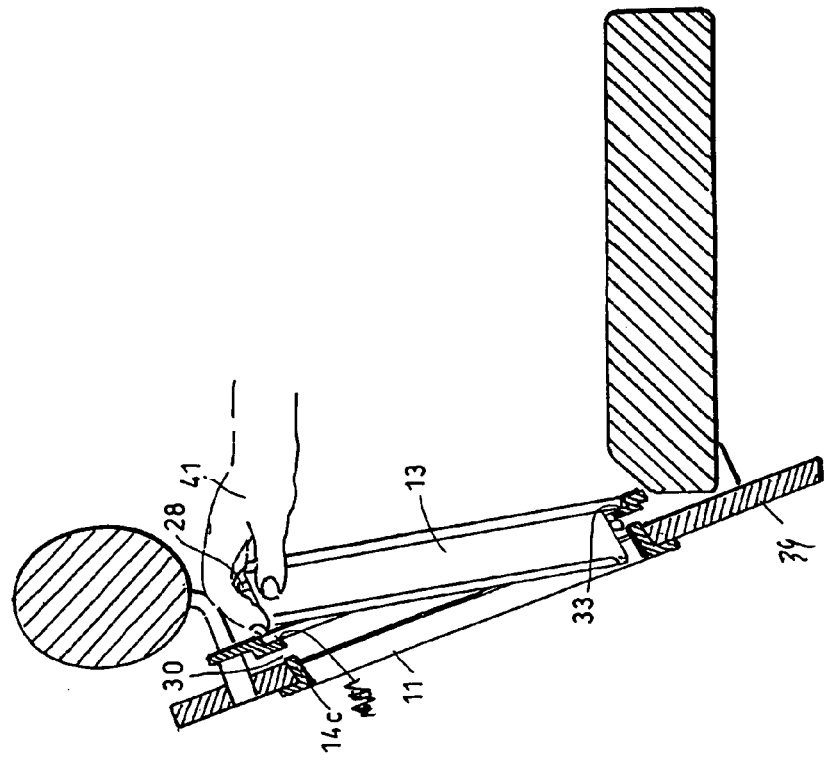

THROUGH-SEAT HOLDER FOR MOTOR VEHICLE

FIELD OF THE INVENTION

The present invention relates to a through-seat holder for a motor vehicle. More particularly this invention concerns such a holder that can accommodate elongated freight, an electronic device, or the like.

BACKGROUND OF THE INVENTION

U.S. Pat. No. 6,398,284 describes a transport container for a motor vehicle having a partition, normally a seat back, between two compartments. It has a generally rectangular vehicle frame set in the partition and having generally parallel horizontal members and generally parallel vertical members interconnecting ends of the horizontal members and defining therewith an opening. A generally rectangular device frame fittable in the opening of the vehicle frame has generally parallel horizontal members and generally parallel vertical members interconnecting ends of the respective horizontal members. Respective pivot formations on the vehicle-frame vertical members define a horizontal pivot axis extending between the vehicle-frame vertical members. Respective pivot formations on the device-frame vertical members and fittable to the respective vehicle-frame pivot formations allow pivoting of the device frame into a mounted position set in the vehicle frame with the members of the device frame closely juxtaposed with the respective members of the vehicle frame and the frames in direct contact with each other at abutment locations offset from the axis. A latch offset from the axis releasably secures the device frame in the mounted position in the vehicle frame.

This construction is fairly simple and allows the device frame to be fitted to the vehicle frame by a simple central pivoting movement. At the end of the pivoting movement the upper and lower horizontal members engage each other to block further movement of the device frame, then the latch holds the frames in this position. Use of the device is extremely easy, it is very solidly held and mounted when in place, and it is inexpensive to manufacture.

Another system described in German patent 3,738,931 of W. Trutter has a device frame with a generally planar and outwardly projecting rim that overlies the front face of the vehicle frame when the two frames are fitted together.

Both these systems are normally mounted in a seat back and normally hold some sort of through-seat storage system like an elongated ski bag that allows skis in the storage compartment behind the seat to project forward through the seat back into the passenger compartment while remaining neatly encased in the forwardly extended ski bag. They can also hold, for instance, a DVD or CD player, a television, or a small refrigerator or cooler and can even be mounted in a side wall of the vehicle.

It is fairly difficult with these systems to mount the device frame in the vehicle frame. Typically it must be the pivot formations must be carefully fitted together and then the device frame is swung into place. If the pivots on the two frame are not perfectly fitted together, the device may be swung into place into a position in which it is not secured on the pivot side so that, in an accident, the device frame can pop forward out of the vehicle frame.

Another problem with these systems is that the device frame projects fairly far through the vehicle frame at least at the start when the device frame is being fitted to the vehicle frame. Thus use of this system in a motor-vehicle side wall, where clearance on the outside of the vehicle frame is limited, is impossible. Furthermore even standard use with the vehicle frame fitted to a seat back makes it impossible to install the device frame when the rear storage compartment is full, that is when there is no clearance rearward of the vehicle frame for the device frame to swing as it is moved into its mounted position.

OBJECTS OF THE INVENTION

It is therefore an object of the present invention to provide an improved through-seat holder for motor vehicle.

Another object is the provision of such an improved through-seat holder for motor vehicle that overcomes the above-given disadvantages, in particular that is particularly easy to mount, even with one hand, in the vehicle.

SUMMARY OF THE INVENTION

A through-seat holder for a motor vehicle having a partition has according to the invention a vehicle frame set in the partition and having generally parallel longitudinal members and transverse side members interconnecting ends of the longitudinal members and defining therewith a throughgoing opening. The longitudinal members are spaced apart by a predetermined transverse distance and form a pair of parallel outwardly facing guide faces flanking the opening and spaced apart by a predetermined transverse dimension greater than the transverse distance. A device frame fittable in the opening of the vehicle frame has generally parallel longitudinal members and transverse side members interconnecting ends of the respective longitudinal members. One of the device-frame transverse members is formed with a rim having a transverse width equal substantially to the dimension so that the rim cannot pass through the opening when extending transversely. The rim forms a pair of transversely spaced contact points engageable with the faces and defining a transversely extending pivot axis. A latch offset from the axis releasably secures the device frame in a mounted position in the vehicle frame.

Thus with this system the axis-defining points are positioned on the guide faces and the device frame is pivoted about the axis into the mounted position fitted to the opening of the vehicle frame. It is not necessary to meticulously position these two points in any one location; instead they are just rested on the two faces and then slid down while the device frame is pushed back toward the vehicle frame. When the points reach the lower ends of the guide faces, the frame can fit into the vehicle frame. This construction makes one-handed installation of the device frame possible and even easy. It is not necessary to fit the device frame carefully through the vehicle frame and then align the pivot lugs of the device frame with the pivot pockets of the vehicle frame. In fact, the construction is such that during pivoting of the device frame about the axis into the mounted position fitted in the opening, the device frame need never project rearwardly past the vehicle frame, making the system suitable for installation in close quarters, e.g. a motor-vehicle passenger-compartment side wall. Furthermore installing the device frame in a vehicle frame set in a seat is possible even when the rear storage compartment is packed full.

According to the invention the vehicle frame is annular and its transverse members extend generally perpendicular to its longitudinal members. Similarly, the device frame is annular and its transverse members extend generally perpendicular to its longitudinal members. Furthermore, the transverse members and the axis are generally horizontal.

Normally the one transverse member having the rim defining the axis is below the other of the device-frame transverse members. This makes for a natural and simple tipping up and in movement to fit the device frame to the vehicle frame.

The rim according to the invention projects outwardly from the device frame, normally at least from the device-frame longitudinal members and the one device-frame transverse member. Preferably the rim is annular and projects outwardly from all the device-frame members. This rim or its edge defines the axis. Typically corners of the rim define the points that in turn define the axis.

The device frame in accordance with the invention is formed with an inset groove that extends at least along both vehicle-frame longitudinal members and the one vehicle-frame transverse member. Normally according to the invention the groove is annular and surrounds and defines the opening. A floor of the groove defines the faces. The groove extends generally full lengths of the device-frame longitudinal members and the points are slidable along the faces. With the rim and the groove both being annular, any gap between the device frame and the vehicle frame is covered by the rim and closed effectively, producing a neat and attractive appearance and preventing any air leaks through the partition around the device frame.

BRIEF DESCRIPTION OF THE DRAWING

The above and other objects, features, and advantages will become more readily apparent from the following description, reference being made to the accompanying drawing in which:

FIG. 1 is a perspective view of the holder according to the invention in disassembled condition;

FIG. 2 is a front view of the device frame;

FIG. 3 is a vertical section taken along line III—III of FIG. 1;

FIG. 4 is a horizontal section taken along line IV—IV of FIG. 1;

FIG. 5 is a front view of the vehicle frame;

FIG. 6 is a vertical section illustrating installation of the device frame and its associated parts in the vehicle frame; and FIGS. 7 through 10 are views like FIG. 7 illustrating further steps in the installation of the device frame in the vehicle frame.

SPECIFIC DESCRIPTION

Figure 8:
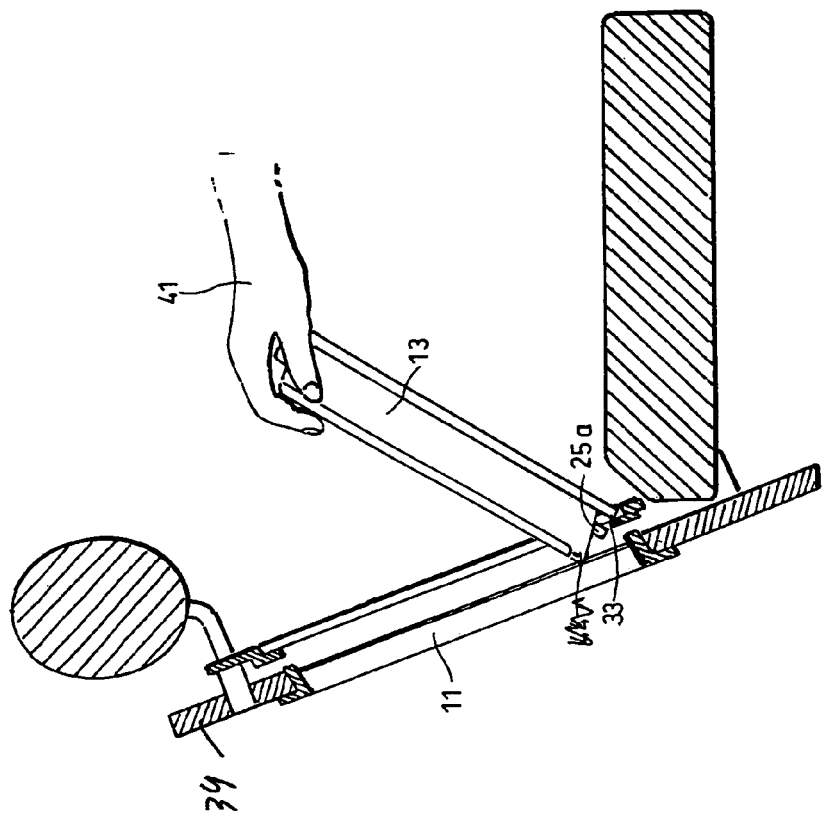

As seen in FIG. 1 a through-seat holder 10 according to the invention basically comprises a molded plastic vehicle frame 11 and an also molded plastic device frame 13 defining an opening 16 (see also FIG. 5) holding a device 12 having a front cover 18 and a rear cover 19 defining a space 20 (FIG. 4) holding, for example, a ski bag. A button 21 on the device frame 13 can be pushed to swing the front cover 18 out about an axis m and also pivotally release the rear cover 19 for use of the device 12. The frame 11 is set as shown in FIG. 6 in a partition 34 forming a seat back that can carry a headrest shown schematically at 35 and an arm rest 37 pivoted at 36 on the partition 34 and movable to an upright position overlying and in fact covering the frame 11. The partition or seat back 34 separates a rear storage compartment 38 from a front passenger compartment 39 (FIG. 6) of a motor vehicle, although it could also separate a front passenger compartment from a rear passenger compartment or even be a side vehicle wall.

As also shown in FIGS. 2 and 3, the device frame 13 is rectangularly annular and has two normally horizontal bottom and top transverse members 17a and 17c whose ends are interconnected by two normally vertical side longitudinal members 17b and 17d. They form a generally planar rim or flange 23 having bottom and top parts 23a and 23c and side parts 23b and 23d. Further flanges 27a, 27b, 27c, and 27d extend inward perpendicular from the plane of the rim 23 from inner edges of its flanges 23a, 23b, 23c, and 23d. The lower flange 27a is angled downward as shown in FIG. 6 so that in a mounted position it locks the lower part of the frame 13 to the frame 11.

Similarly, as also shown in FIG. 5 the frame 11 has two normally horizontal bottom and top transverse members 14a and 14c whose ends are interconnected by two normally vertical side longitudinal members 14b and 14d. They are formed with inwardly extending flanges 15a, 15b, 15c, and 15d that define the opening 16. An inset or groove 24 extends around the opening 16, forming coplanar outwardly directed faces 24a, 24b, 24c, and 24d and having inwardly directed straight edges 40a, 40b, 40c, and 40d extending perpendicular to the respective faces 24a, 24b, 24c, and 24d. A transverse or horizontal spacing w (FIG. 5) between the edges 40a and 40b is slightly greater than a transverse or horizontal spacing B (FIG. 2) between outer edges of the flanges 27b and 27d, a transverse or horizontal spacing b between confronting inner faces of the flanges 15b and 15d is less than the spacing w but slightly greater than a transverse spacing W between the edges 40b and 40d of the members 23b and 23d, and the transverse members 17a, 17c, 14a, and 14c are similarly dimensioned so that the device frame 13 can sit in the groove 24 but not pass through the opening 16. The bottom member 17a of the frame 13 is formed with two downwardly projecting pins or lugs 25a and 25b that can fit into complementary upwardly open pockets 26 (FIG. 3 only) formed in the lower flange 15a of the vehicle frame 11 in a mounted position with the rim 23 seated in the groove 24. In addition the upper transverse member 17c of the device frame 13 is provided with a movable pin or lug 28 that can engage in a downwardly open pocket 30 of the upper flange 15c of the vehicle frame 11. An actuator button 29 on the front cover 18 can be depressed to retract the lug 28 out of the pocket 30.

Figure 7:
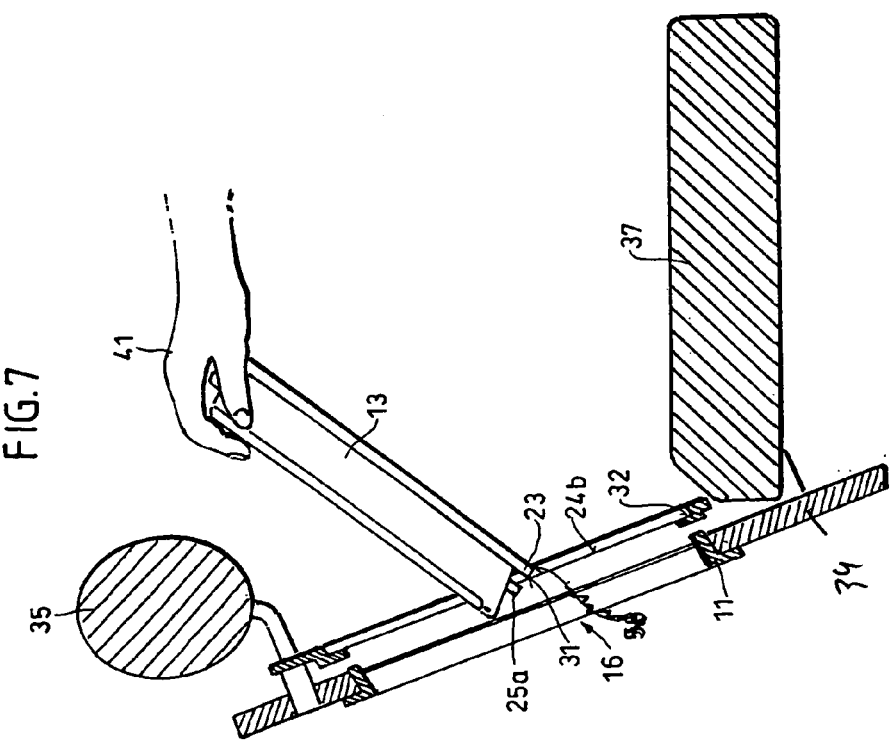

According to the invention the device frame 13 and its device 12 is fitted to the vehicle frame 11 as follows:

As shown in FIG. 6 a user need merely grip the upper member 17c with his or her hand 41 and then set it as shown in FIG. 7 in the frame 11 so that lower outer corners 22e and 22f, which define contact points, engage in the groove faces 24b and 24d of the groove 24 somewhat above the face 24a. An inner lower edge 31 of the rim 23 will ride on the faces 24b and 24d and defines a pivot axis extending through the contact points defined by the corners 22e and 22f.

Thereafter as shown in FIG. 8 the user slides the frame 13 down until the edge 31 seats at 32 (FIG. 7) in the groove 24 at the face 24a. Thereafter the user pivots the frame 13 back about the axis defined by the edge 31 as shown in FIG. 9 until a front face of the frame 13 is almost coplanar with the frame 11, whereupon as shown in FIG. 10 a simple push on the front of the frame 13 seats it in place. Normally the lug 28 is spring loaded so that it can be depressed inward as the frame 13 fits into the frame 11, but snaps out once fully inserted so as to lock in the pocket 30.

In the mounted position shown in FIGS. 3, 4, and 10, the lugs 25a and 25b are seated in the pockets 26 to hold the bottom of the device frame 13 in place, although the downward angling of the lower flange 15a will also serve to retain it. A front face of the device frame 13 is flush with a front face of the vehicle frame 11 so that, if the arm rest 37 (FIG. 6) is pivoted up, the entire holder 10 will be covered.

We claim:

1. A holder for a motor vehicle having a partition, the holder comprising:
   a vehicle frame set in the partition and having generally parallel longitudinal members and transverse members interconnecting ends of the longitudinal members and defining therewith a throughgoing opening, the longitudinal members having confronting inner edges spaced apart by a predetermined transverse distance, the longitudinal members forming a pair of parallel outwardly facing guide faces flanking and extending from the opening and having outer edges spaced apart by a predetermined transverse dimension greater than the distance;
   a device frame wholly separable from the vehicle frame, fittable in the opening of the vehicle frame, and having generally parallel longitudinal members and transverse members interconnecting ends of the respective longitudinal members, one of the device-frame transverse members being formed with a rim having a transverse width greater than the distance and smaller than the dimension, whereby the rim cannot pass through the opening when extending transversely, the rim forming a pair of transversely spaced contact points engageable with and slidable alone the faces and defining a transversely extending pivot axis; and
   latch means offset from the axis for releasably securing the device frame in a mounted position in the vehicle frame.

2. The holder defined in claim 1 wherein the vehicle frame is annular and the transverse members of the vehicle frame extend generally perpendicular to the longitudinal members of the vehicle frame.

3. The holder defined in claim 2 wherein the device frame is annular and the transverse members of the device frame extend generally perpendicular to the longitudinal members of the device frame.

4. The holder defined in claim 3 wherein the transverse members of both said frames and the axis are generally horizontal.

5. The holder defined in claim 4 wherein the one device-frame transverse member having the rim defining the axis is below the other of the device-frame transverse members.

6. The holder defined in claim 5 wherein the rim projects outwardly from the device frame.

7. The holder defined in claim 6 wherein the rim projects outwardly at least from the device-frame longitudinal members and the one device-frame transverse member.

8. The holder defined in claim 7 wherein the rim is annular and projects outwardly from all the device-frame members.

9. The holder defined in claim 8 wherein the rim defines the axis.

10. The holder defined in claim 9 wherein an edge of the rim defines the axis.

11. The holder defined in claim 10 wherein the rim has corners defining the contact points.

12. The holder defined in claim 10 wherein on pivoting of the device frame about the axis on the vehicle frame with the contact points in contact with the faces, the device frame does not project rearwardly past the vehicle frame.

13. The holder defined in claim 11 wherein the vehicle frame is formed with an inset groove.

14. The holder defined in claim 13 wherein the groove extends at least along both of the vehicle-frame longitudinal members and at least one of the vehicle-frame transverse members.

15. The holder defined in claim 14 wherein the groove is annular and surrounds and defines the opening.

16. The holder defined in claim 13 wherein the groove has a floor defining the faces.

17. The holder defined in claim 13 wherein the groove extends generally full lengths of the device-frame longitudinal members.

18. The holder defined in claim 17 wherein the points are slidable along the faces.

19. A holder for a motor vehicle having a partition, the holder comprising:
   a generally rectangular and annular vehicle frame set in the partition and having generally parallel longitudinal members and transverse members interconnecting ends of the longitudinal members and defining therewith a throughgoing opening, the longitudinal members having confronting inner edges spaced apart by a predetermined transverse distance, the vehicle frame being formed around the opening with an outwardly open groove having a floor forming on the longitudinal members a pair of parallel outwardly facing guide faces flanking the opening and having outer edges spaced apart by a predetermined transverse dimension greater than the distance;
   a generally rectangular and annular device frame wholly separable from the vehicle frame, fittable in the opening of the vehicle frame, and having generally parallel longitudinal members and transverse members interconnecting ends of the respective longitudinal members, the device frame being formed with an outwardly projecting rim fittable in a mounted position with the device frame fitted to the opening in the groove, the rim having a transverse width greater than the distance and smaller than the dimension, whereby the rim cannot pass through the opening when extending transversely, the rim having two adjacent corners forming a pair of transversely spaced contact points engageable with and slidable alone the faces and defining a transversely extending pivot axis; and
   latch means offset from the axis for releasably securing the device frame in a mounted position in the vehicle frame.

* * * * *